E. L. CROSWHITE.
WIRE REEL.
APPLICATION FILED JAN. 23, 1920.
1,385,522.
Patented July 26, 1921.
2 SHEETS—SHEET 1.
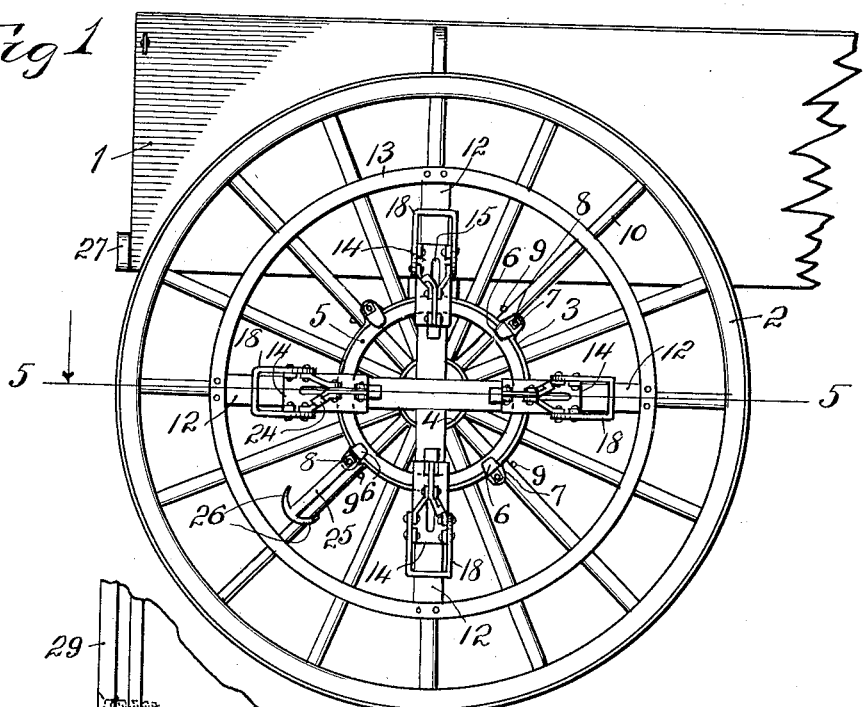
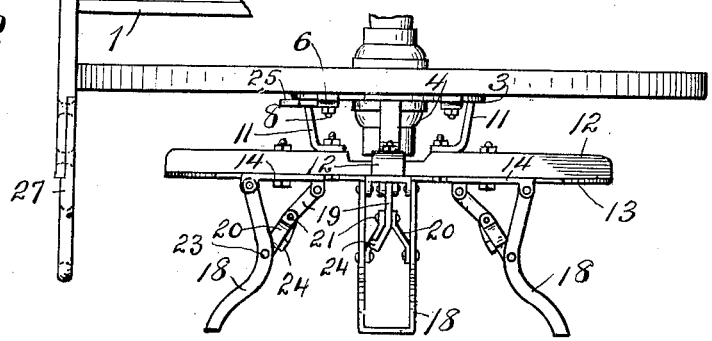
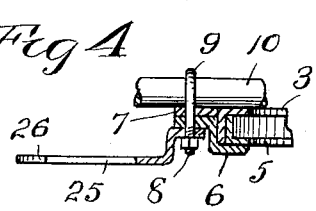
Witness:
R. E. Hamilton
Inventor:
Estel L. Croswhite
By Warren D. House,
His Attorney.

E. L. CROSWHITE.
WIRE REEL.
APPLICATION FILED JAN. 23, 1920.
1,385,522.
Patented July 26, 1921.
2 SHEETS—SHEET 2.
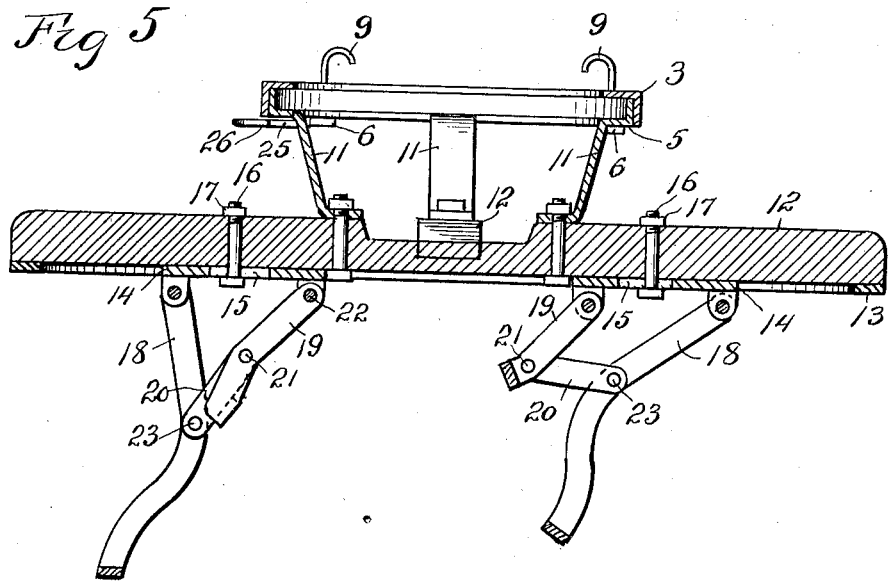
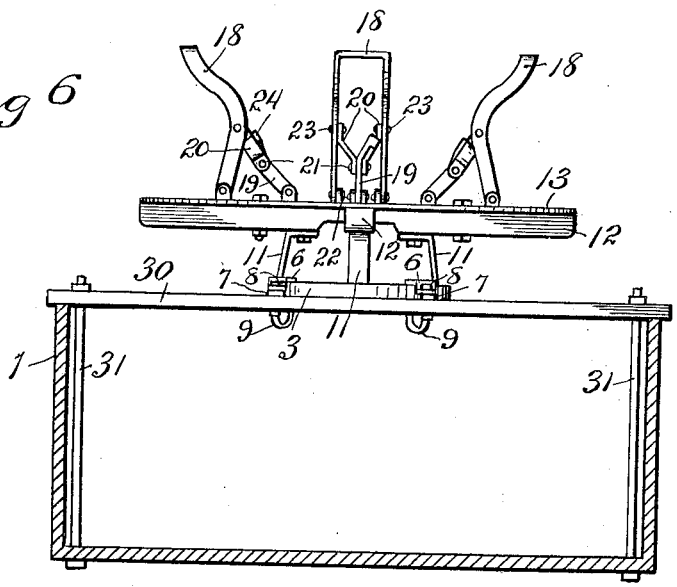
Inventor,
Estel L. Croswhite
By Warren D. House,
His Attorney.
Witness:
R. E. Hamilton

UNITED STATES PATENT OFFICE.

ESTEL L. CROSWHITE, OF KANSAS CITY, MISSOURI.

WIRE-REEL.

1,385,522.

Specification of Letters Patent.   Patented July 26, 1921.

Application filed January 23, 1920. Serial No. 353,552.

*To all whom it may concern:*

Be it known that I, ESTEL L. CROSWHITE, a citizen of the United States, residing at Kansas City, in the county of Jackson and State of Missouri, have invented a certain new and useful Improvement in Wire-Reels, of which the following is a specification.

My invention relates to improvements in wire reels.

One of the objects of my invention is to provide a novel reel for supporting wire in a bundle, the reel being adapted to be attached to and revolved with a vehicle wheel and being adjustable to different diameters so as to wind wire into bundles of different diameters or to hold wire bundles of different diameters in a position concentric with the axis of the wheel.

My invention provides further, in a device of the kind described, novel wire supporting means arranged for concentric expansion and contraction and for adjustment to and from a wire bundle holding position.

My invention provides still further a rotary wire bundle supporting device having novel means by which said device may be releasably locked to a vehicle wheel with which it is adapted to rotate.

My invention provides still further a wire reel which is simple in construction, cheap to manufacture, durable and not liable to get out of order, and which is efficient in operation.

The novel features of my invention are hereinafter fully described and claimed.

In the accompanying drawings, which illustrate the preferred embodiment of my invention, Figure 1 is a side elevation of a wheel and a portion of the body of a vehicle provided with my improvement.

Fig. 2 is a top view of what is shown in Fig. 1.

Fig. 3 is a rear elevation of a portion of the wire guide.

Fig. 4 is an enlarged sectional view of the pivoted locking member and parts connected therewith.

Fig. 5 is an enlarged horizontal sectional view on the line 5—5 of Fig. 1 the vehicle wheel being omitted.

Fig. 6 is a vertical sectional view of a wagon bed, upon which is mounted my improved wire reel.

Similar reference characters designate similar parts in the different views.

1 and 2 designate respectively the body and one of the rear carrying wheels of a vehicle, such as an ordinary wagon.

3 designates a base member comprising a ring adapted to encircle concentrically the hub 4 of the wheel 2.

Rotatably mounted on the ring 3 is a member 5, which is held in position by means of plates 6, which are respectively clamped to lugs 7 on the periphery of the ring 3 by means of bolts 8 having respectively at their inner ends hooks 9 adapted to respectively embrace spokes 10 of the wheel 2.

The member 5 is provided with outwardly extending arms 11, to which are attached two crossed bars 12, to the outer ends of which is secured a bracing ring 13.

Mounted on the bars 12 is a wire bundle holding and winding mechanism which is expansible and contractible concentrically with the axis of the wheel 2 and which is movable to and from a bundle holding position. Such wire bundle holding means comprises preferably the following described mechanism. 14 designates two pairs of plates mounted one pair on each bar 12, each plate being provided with a radial slot 15, through which extends a bolt 16 having a nut 17, the bolt being extended through the adjacent bar 12. By loosening the nuts 17, the plates 14 may be adjusted radially on the bars 12 to positions in which they will be equi-distant from the axis of the rotary member 5, which also has the same axis as the wheel 2.

Respectively pivoted to the plates 14 are U-shaped curved wire holding arms 18, which are movable from the bundle holding position shown at the left in Fig. 5, to the position at the right in Fig. 5, in which latter position, a bundle of wire may be slipped onto or removed from the arms 18.

For holding each arm 18 in the bundle holding position, shown in Figs. 1, 2 and 6, and at the left in Fig. 5, I provide a link 19, which is pivoted to and between two links 20 by a pin 21. The link 19 is pivoted to the adjacent plate 14 by a pin 22. The links 20 are pivoted respectively to the arms of the wire holding arm 18, by two pins 23.

When the arm 18 is moved to the holding position, the pin 21 crosses a plane which extends through the pins 22 and 23. A lip 24 on the link 19 strikes one of the links 20 to limit the movement of the links in passing to the holding position. By means of this construction, the pressure of the wire which is wound on the concave outer edges of the arms 18, will not force said arms from their operative holding position. The arms 18 may be released from the holding position by swinging the links 19 and 20 to the position shown at the right in Fig. 5, in which position the pin 21 will cross the plane connecting the pins 22 and 23, and the wire supporting arms 18 will be in the contracted position, shown at the right in Fig. 5, thereby permitting a bundle of wire, not shown, which has been wound on the arms to be slipped therefrom.

In order that the rotary member 5 may be locked against rotation on the base member 3, there is pivoted to one of the bolts 8 a locking member 25, Figs. 1 and 4, which is provided at its outer end with two oppositely facing hooks, 26, either one of which is adapted to releasably engage any one of the arms 11, of the rotary member 5.

For guiding the wire onto the arms 18, I provide a horizontal plate 27, having a wire receiving slot 28 and attached to a transverse horizontal bar 29 which in turn is rigidly attached to the bed or body 1 of the vehicle.

When it is desired to wind wire which is strung along the ground, upon the reel, the wire is extended through the slot 28 and is attached to one of the arms 18, and one of the hooks 26 is engaged with one of the arms 11, thus holding the member 5 locked to the base member 3. If the vehicle is now moved forwardly, the member 5 will be revolved with the wheel 2, and the wire will be drawn through the slot 28 and will be wound upon the arms 18, the latter being set in the holding position shown in Fig. 2, and at the left in Fig. 5. After a bundle has been wound upon the arms 18, the links 19 and 20 are swung with the arms 18 to the release position shown at the right in Fig. 5, in which position the bundle may be slipped off.

If it is desired to unwind wire from a bundle on the arms 18, the member 25 is unhooked from the arm 11 with which it is engaged, upon which the member 5 may be revolved on the base member 3 and the wire withdrawn from the arms 18 by pulling on the wire, or by holding the wire and moving the vehicle forwardly.

As each plate 14 can be adjusted radially on the bar 12 which supports it, all of the plates 14 may be adjusted so as to be equidistant from the axis of the wheel 2, in the expansion or contraction of the wire holding mechanism. The bundle of wire carried by the arms 18 will, thus, be held concentric with the wheel 2, thereby permitting the winding and unwinding of the wire to be effected in an even and not a jerky manner, such as would be the case if the arms 18 were not concentric with the axis of the wheel 2.

The member 25 is provided with two oppositely facing hooks 26, so that it may lock with any one of the arms 11 when the member 5 is turned in either direction.

Sometimes, when it is desired merely to unwind wire from a bundle carried by the arms 18, the device may be used as shown in Fig. 6, at which time the member 3 is clamped horizontally by the bolts 8 to a cross bar 30 mounted on the bed 1 and clamped thereto by bolts 31. When the vehicle moves forwardly and the wire is held, it will effect rotation of the member 5 and the bars 12 in a direction such that the wire will be withdrawn from the arms 18.

I do not limit my invention to the structure shown and described, as many modifications, within the scope of the appended claims, may be made without departing from the spirit of my invention.

What I claim is:—

1. In a wire reel, the combination with a base member having means for attachment to a suitable support, of a member rotatable thereon, a plurality of wire bundle holding devices carried by the rotary member, and a member pivoted to the base member and having two oppositely facing hooks, either of which is adapted for being releasably locked to the rotary member.

2. In a wire reel, the combination with a base member having means for attachment to a suitable support, of a rotary member having one or more arms and rotatably mounted on said base member, a locking member pivoted to the base member and having two oppositely facing hooks, either of which is adapted for locked engagement with any one of said arms, and wire bundle holding means carried by said rotary member.

3. In a wire reel, the combination with a base member having means for being attached concentrically to the wheel of a vehicle, of a member rotatable on said base member, a plurality of plates radially adjustable to positions equi-distant from the axis of the rotary member on said rotary member, a plurality of wire holding arms respectively pivoted to said plates and movable thereon to and from a wire bundle holding position, and releasable means for holding said arms in the holding position.

4. In a wire reel, the combination with a base member having means for concentric attachment to the wheel of a vehicle, of a member rotatable on said base member, releasable means for locking the rotary member against rotation on the base member, a plurality of plates adjustable on said rotary member to positions equi-distant from the axis of the rotary member, a plurality of wire holding arms respectively pivoted to said plates and movable thereon to and from a wire bundle holding position, and releasable means for holding said arms in the holding position.

5. In a wire reel, the combination with two crossed bars, of means for rotatably supporting said bars, a plurality of plates respectively radially adjustable on said bars to positions equi-distant from the axis of said bars, a plurality of bundle holding members respectively pivoted to said plates and movable thereon to and from a bundle holding position, and releasable means for locking the bundle holding members in the holding position.

In testimony whereof I have signed my name to this specification.

ESTEL L. CROSWHITE.